(12) United States Patent
Chen et al.

(10) Patent No.: US 10,372,523 B2
(45) Date of Patent: Aug. 6, 2019

(54) ANALYSIS SYSTEM AND METHOD FOR INTELLIGENT CUSTOMER SERVICE BASED ON COMMON SEQUENCE PATTERN

(71) Applicant: EMC Corporation, Hopkinton, MA (US)

(72) Inventors: Chao Chen, Shanghai (CN); Yu Fu, Shanghai (CN); Jove Qianjie Zhong, Shanghai (CN); Jingjing Liu, Shanghai (CN); Qiyan Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/064,312

(22) Filed: Oct. 28, 2013

(65) Prior Publication Data

US 2014/0122932 A1 May 1, 2014

(30) Foreign Application Priority Data

Oct. 29, 2012 (CN) .......................... 2012 1 0439999

(51) Int. Cl.
*G06F 11/00* (2006.01)
*G06F 11/07* (2006.01)
(52) U.S. Cl.
CPC ........ *G06F 11/079* (2013.01); *G06F 11/0706* (2013.01)
(58) Field of Classification Search
CPC .............. G06F 11/079; G06F 11/0706; G06F 11/0709; G06F 11/0778; G06F 11/3648; G06F 11/3466
USPC ..................................... 714/48, 37
See application file for complete search history.

(56) References Cited

U.S. PATENT DOCUMENTS

| | | | |
|---|---|---|---|
| 6,658,599 B1 | 12/2003 | Linam et al. | |
| 7,139,940 B2* | 11/2006 | Arbeitman | G06F 11/0775 714/48 |
| 9,483,484 B1* | 11/2016 | Sridharan | G06F 17/30153 |
| 10,148,681 B2* | 12/2018 | Banerjee | H04L 63/1433 |
| 2002/0124214 A1* | 9/2002 | Ahrens, Jr. | G06F 11/0712 714/57 |
| 2005/0257103 A1* | 11/2005 | Choudhary | G06Q 10/10 714/100 |
| 2005/0283680 A1* | 12/2005 | Kobayashi | G06F 11/3636 714/39 |

(Continued)

FOREIGN PATENT DOCUMENTS

CN 1770706 5/2006

OTHER PUBLICATIONS

Wikipedia definition of "threshold value", retrieved from https://en.wikipedia.org/wiki/Critical_value on May 29, 2018 (Year: 2018).*

*Primary Examiner* — Yair Leibovich
(74) *Attorney, Agent, or Firm* — BainwoodHuang (57) ABSTRACT

The present invention provides a method and system for information analysis. The method extracts a plurality of metadata from a source information set so as to generate a metadata set, the metadata comprising error log information that forms an error sequence in the metadata set; and generates a common error sequence set for a plurality of the metadata sets. By means of the method, it is possible to easily obtain a global error sequence pattern, and easily compare a new error with a previous error sequence pattern so as to prevent, diagnose and recover the new error.

20 Claims, 5 Drawing Sheets

(56) References Cited

U.S. PATENT DOCUMENTS

| | | | |
|---|---|---|---|
| 2006/0095524 A1* | 5/2006 | Kay | G06Q 10/107 |
| | | | 709/206 |
| 2006/0164996 A1* | 7/2006 | Meguerditchian | ............... |
| | | | H04L 12/2602 |
| | | | 370/241 |
| 2007/0150470 A1 | 6/2007 | Brave et al. | |
| 2009/0064329 A1* | 3/2009 | Okumura | H04L 51/12 |
| | | | 726/22 |
| 2009/0182856 A1* | 7/2009 | Gotta | H04L 41/046 |
| | | | 709/223 |
| 2011/0314148 A1* | 12/2011 | Petersen et al. | 709/224 |
| 2013/0276114 A1* | 10/2013 | Friedrichs | G06F 21/56 |
| | | | 726/23 |
| 2016/0306923 A1* | 10/2016 | van Rooyen | G06F 19/28 |
| 2017/0214701 A1* | 7/2017 | Hasan | H04L 63/1408 |
| 2018/0285840 A1* | 10/2018 | Hasan | G06Q 20/0655 |
| 2018/0301222 A1* | 10/2018 | Dew, Sr. | G06Q 50/24 |
| 2018/0357299 A1* | 12/2018 | Miranda | G06F 16/2358 |
| 2019/0005018 A1* | 1/2019 | Sharma | G06F 17/2785 |
| 2019/0069047 A1* | 2/2019 | Wood | H04N 21/458 |
| 2019/0073156 A1* | 3/2019 | Velusamy | G06F 3/0659 |
| 2019/0079818 A1* | 3/2019 | Handa | G06F 11/079 |

* cited by examiner

ANALYSIS SYSTEM AND METHOD FOR INTELLIGENT CUSTOMER SERVICE BASED ON COMMON SEQUENCE PATTERN

FIELD

The present invention relates to the field of information analysis, and more specifically, to an analysis system and method based on a common sequence pattern.

BACKGROUND

With the constant development of computer technology, there always exist circumstances where production components need to be deployed in a plurality of systems. Once an error occurs, analysis for a complex production component is a time-consuming and difficult job (which may even be true for a simple production deployment). The related information (e.g. application logs, system logs/events) is placed in several hosts/components/instances. How to analyze the information and find the root cause is a big challenge.

Generally existing methods look for problems by viewing a single log file of a single case, which cannot detect the event sequence and get the useful information. In a complex multiple production environment, it is very hard to find the root cause, especially when there is much noisy information. Historic logs cannot be leveraged for future diagnostic and serious problem prevention. The previous information after the analysis cannot be kept in a proper form. It is seen that it is very hard to get the root cause from a complex issue without comparing different log information.

SUMMARY

In view of the above problems in the art, the present invention provides a solution as below.

According to a first aspect of the present invention, there is provided a method for information analysis, comprising: generating a metadata set based on a source information set, the metadata comprising error log information that forms an error sequence in the metadata set; and generating a common error sequence set for a plurality of the metadata sets.

According to a second aspect of the present invention, there is provided a system for information analysis, comprising: a pre-processing device used for generating a metadata set based on a source information set, the metadata comprising error log information that forms an error sequence in the metadata set; and a common sequence generating device for generating a common error sequence set for a plurality of the metadata sets.

It should be noted that the flowchart and block diagrams in the figures illustrate the architecture, functionality, and operation of possible implementations of apparatuses, methods and computer program products according to various embodiments of the present invention. In this regard, each block in the flowchart or block diagrams may represent a module, program segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

DETAILED DESCRIPTION

The principles and spirit of the present invention will be described below with reference to some exemplary embodiments. It is to be understood that these embodiments are provided only for enabling those skilled in the art to better understand and further implement the present invention, rather than limiting the scope of the present invention in any fashion.

To analyze information, it is necessary to collect information that is used as an analysis basis. The collected information for analysis includes, for example, application logs, system events/logs, process/thread dumps, user/application records, etc, which come from different sources in different customer environments. The term "logs" will be used to represent all these kinds of information, and most of "logs" are unstructured data. "Error log information" is used to represent error-related information in "logs." Note that the term "errors" herein is general, which may include various levels of information related to errors or potential dangers such as runtime errors, warns, DEBUG, INFO, etc., and whose coverage may be adjusted by users at any time.

Characters for the error log information in logs may be summarized as below:

1. Repeatability: if the errors are caused by software defects, they will occur in many customers' environments, and the issue will be reported many times.

2. Causality: if several errors frequently occur in a specific sequence, they may have a causality relationship to a great extent.

3. Distributive: the logs are distributed in several hosts/components/instances, some are produced by productions, middleware, and some others are produced by the operating system OS (like Windows Event) or system logs for CPU/memory/Network.

4. Premonitory: many errors do not occur abruptly, but they have some preceding errors or warn events.

5. Posterior: many errors do not stop immediately, but they can cause consequent errors.

6. Severity: usually the earlier errors have smaller destructiveness but later ones have bigger.

Due to the above characters, for a long-standing production/solution system, there are many historic logs from customer cases for data mining. In this disclosure, there is introduced an analysis system for intelligent customer service based on a common sequence pattern in logs, wherein the common sequence is also the common problems in the production. These patterns will be used for categorizing different problems, finding the root cause of different symptoms, and designing "pre-active" resolution before the serious problem happens, etc.

Figure 1:
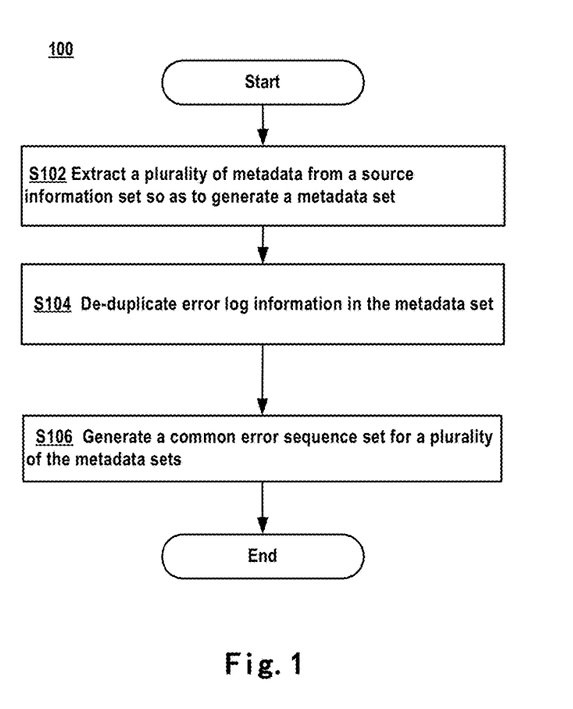
FIG. 1 shows a flowchart of a method 100 for information analysis according to the present invention.
Figure 2:
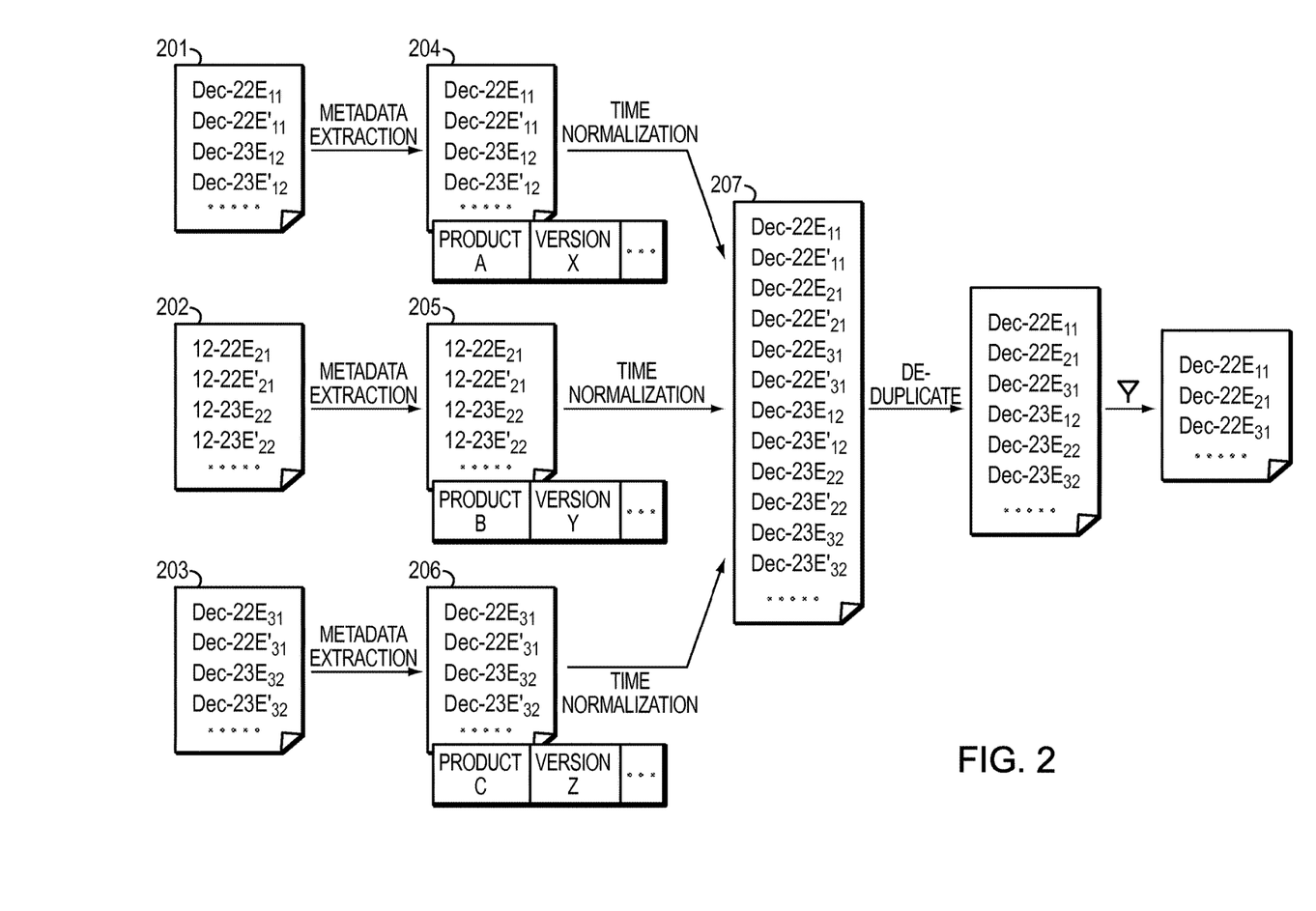
FIG. 2 shows an exemplary view for generating a metadata set according to one embodiment of the present invention.
Figure 3:
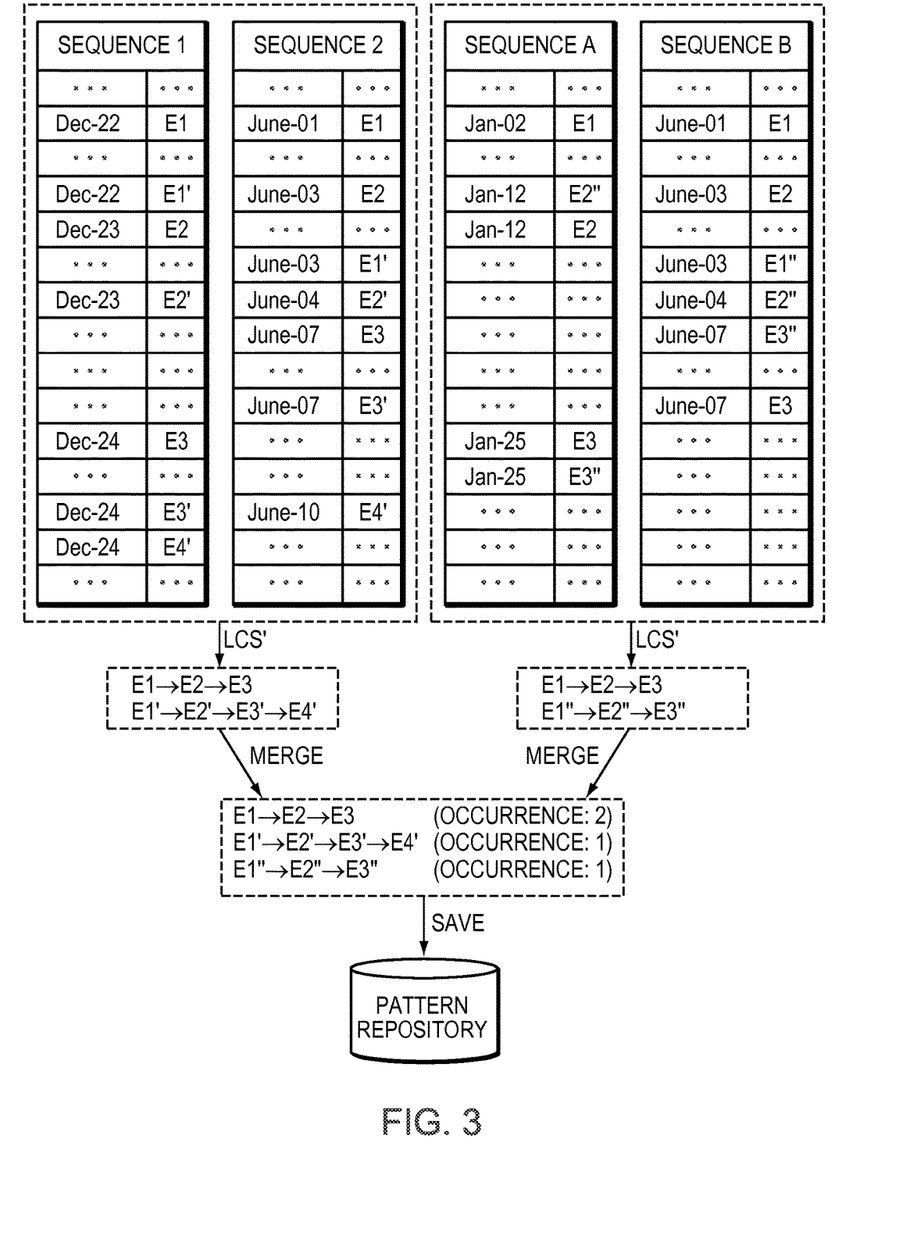
FIG. 3 shows an exemplary view for generating a common error sequence set according to one embodiment of the present invention.

FIG. 1 shows a flowchart of a method 100 for information analysis according to the present invention. It is to be understood that various steps of method 100 may be executed in a different order and/or in parallel. Further, method 100 may comprise additional steps and/or steps that are not shown. The scope of the present invention is not limited in this regard. To better describe the present invention, method 100 will be described in detail below in conjunction with FIGS. 2 and 3. FIG. 2 shows a schematic view for generating a metadata set according to one embodiment of the present invention. FIG. 3 shows a schematic view for generating a common error sequence set according to one embodiment of the present invention. Those skilled in the art may appreciate that FIGS. 2 and 3 are for illustration only and not limiting the present invention.

After method 100 starts, it first proceeds to step S102 where a metadata set is generated based on a source information set. Note that the so-called source information includes various information, such as application logs, system events, system logs, process dumps, thread dumps, user records, application records, etc., which come from different sources in different customer environments. The source information is used as the analysis basis. Moreover, the metadata in step S102 includes error log information, which constitutes an error sequence in the metadata set.

Besides the error log information, the metadata may further include time information. Since time information from different source data usually has different formats, to facilitate comparison, it is necessary to normalize formats of time information (i.e., adjust time differences) so as to merge the logs into a single list for single view.

In addition, the metadata may further include log level and/or sources of the error log information, for example, from which thread or which component the log file described by the error log information comes. While extracting the metadata, sometimes only error-above/warn-above error log information may be chosen, because they are more useful in customer service.

For instance, in the example of FIG. 2, metadata 204-206 are extracted from source information sets 201-203, respectively. It can be seen that the time format of metadata 204 is not the same as that of metadata 205. Thus, the time formats need to be unified by normalizing time, as shown in 207.

Return back to FIG. 1. In an optional embodiment of the present invention, method 100 proceeds to step S104 where duplicated error log information is removed from the metadata set. Those skilled in the art may appreciate that step S104 is optional and not necessary, and does not limit the present invention. To reduce the size of the metadata set so as to improve the efficiency, if multiple error log information represents the same log information, then (e.g., neighboring) error log information is shrunk to single error log information. For example, as shown in FIG. 2, a block 207 is subjected to de-duplication, thereby obtaining a simplified block 208.

In step S104, methods for determining duplicated error log information at least comprise:

A. Strict String Match: use strict string match to compare two error messages; if totally the same, then abstract them into a single error.

B. Regular Expression: for example, if the error message is like "Timeout, failed to index document with id xxxxxx", it's still the same error message in the case that other parts of the error message are the same even if the id is "yyyyyy". At this point, a regular expression is used to ignore the id, and the errors are abstracted into a single one.

C. Partial Match: only the key part of the error message will be extracted for comparison. For example, if the error message contains the error lines in some Java logs, the error lines can be ignored as it may change slightly in minor versions. Then other parts of the error messages are compared.

D. Machine Learning: machine learning can be leveraged to categorize and abstract the errors, and users can accept/reject the result from machine learning for accurate abstraction.

E. Human Intervention: users can be involved to confirm whether two kinds of errors can be abstracted into one.

Those skilled in the art may appreciate that methods A-E are merely for illustration and not limiting the present invention.

In addition, methods A-E may be implemented separately; or several of them may be implemented simultaneously as required.

In the real world, most cases will contain gigabyte-sized log content, and the size of the final error log sequence will also be huge. In order to get a more usable error log sequence pattern and remove noise, it is necessary to reduce the error log count. To this end, method 100 may further comprise, for example, a step of filtering the errors based on one multi-dimensional criterion (not shown in FIG. 1). For example, data of the metadata set may be further defined using the time window (within half a year). Or metadata from a source such as specific log files/instances/components may be chosen. In FIG. 2, a block 209 is an example of further defining the metadata set by using "December 22" as the time window. Besides, method 100 may also let users manually remove those errors confirmed as trivial, or considered by the users as duplicated.

So far, method 100 has obtained the metadata set comprising error log information. The error sequence formed by the error log information may be used as an identification of the metadata set, like a signature.

Next, method 100 proceeds to step S106 where a common error sequence set is generated for a plurality of metadata sets. Each common error sequence in this set is referred to as "a common error sequence pattern" or "a common sequence pattern" for short as it can be used for comparing and diagnosing future errors.

A traditional method for generating a common error sequence set may use, for example, the longest common subsequence (LCS) algorithm. Equation (1) shows the traditional LCS algorithm:

$$LCS(X_i, Y_j) = \begin{cases} \emptyset & \text{if } i = 0 \text{ or } j = 0 \\ (LCS(X_{i-1}, Y_{j-1}), x_i) & \text{if } x_i = y_j \\ \text{longest}(LCS(X_i, Y_{j-1}), LCS(X_{i-1}, Y_j)) & \text{if } x_i \neq y_j \end{cases} \quad (1)$$

Where $X_i$ and $Y_j$ each denote an error sequence, and $x_i$ and $y_j$ denote each error in $X_i$ sequence and $Y_j$ sequence, respectively.

This disclosure has improved the LCS algorithm to LCS' algorithm, and exemplary improvements are as below:

1. The compare target is a group of metadata information; the definition of "equal" and "non-equal" in equation (1) is defined by a specific method or users based on message, level, source, etc, per the different scenarios.

2. The common subsequence whose length is bigger than a (e.g., user) defined threshold is used as a "common error sequence."

During the concert comparison, when there are a plurality of metadata sets, as shown in FIG. 3, optionally by comparing every two metadata sets in the plurality of metadata sets, a common error sequence set will be generated for every two metadata sets, and the common error sequence sets generated for every two metadata sets will be merged to a common error sequence set of the plurality of metadata sets. As shown in FIG. 3, an example of a common error sequence pattern generated from sequence 1 and sequence 2 may be E1→E2→E3. This error sequence pattern may, for example, identify some relation between the error log information (in this example, error E1 causes error E2, and in turn, error E2 causes error E3). The generated common error sequence set may be stored in a central sequence pattern repository.

It is easy to understand that the complexity of the above pairwise comparison is O (M*N). When N represents the count of existing, the comparison is done for N*(N−1)/2 times, which is quite huge. Hence, the performance may be further improved: for example, users can remove the confirmed duplicated metadata sets to avoid duplicated efforts. In addition, in an optional embodiment of the present invention, a batch processing (e.g., Hadoop) may be introduced. For example, the generating a common error sequence set for every two metadata sets of the plurality of metadata sets may be implemented in parallel to improve efficiency. In another optional embodiment, statistics may be made and saved regarding how many times each common error sequence occurs. The more times an error sequence occurs, the more frequently it occurs, and the more typical it is. Thus, more efforts need to be put to investigate and resolve this issue.

In addition, according to an optional embodiment of the present invention, after getting the common error log sequence as a log sequence pattern, users might further need to check whether this pattern is a valid pattern. This is because some invalid patterns can be generated (for example, because the threshold of pattern length is too low). Users need to remove these invalid patterns and add them to the pattern blacklist for future filtering. The blacklist needs to be revisited frequently to avoid adding useful patterns.

So far, method 100 ends.

Figure 4:
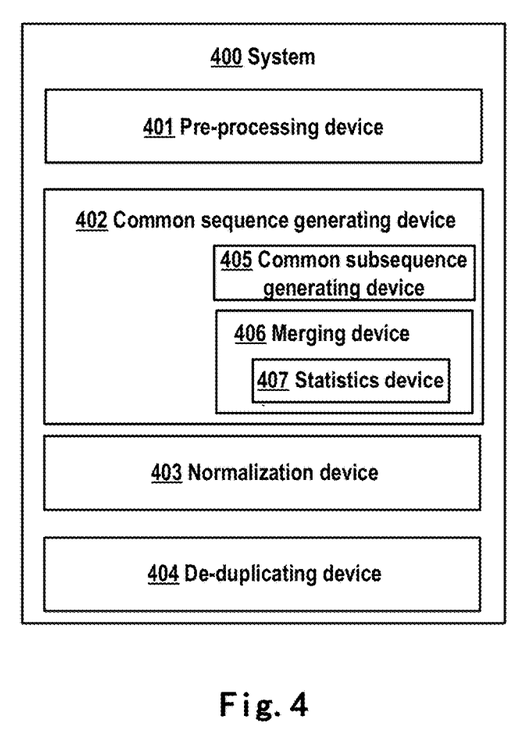
FIG. 4 shows a block diagram of a system 400 for information analysis according to the present invention.

With reference to FIG. 4 below, further description is presented to a block diagram of a system 400 for information analysis according to the present invention. As shown in this figure, system 400 comprises a pre-processing device 401 and a common sequence generating device 402. Pre-processing device 401 is used for generating a metadata set based on a source information set, the metadata comprising error log information that forms an error sequence in the metadata set. Common sequence generating device 402 is used for generating a common error sequence set for a plurality of metadata sets.

In an optional embodiment of the present invention, the metadata may further comprise time information, and system 400 may further comprise a normalization device 403 for normalizing the time information in the metadata set.

In an optional embodiment of the present invention, system 400 may further comprise a de-duplicating device 404 for de-duplicating error log information in the metadata set. The de-duplicating device further comprises device for removing messages of one or more types of: totally the same error logs, error logs that are totally the same except the non-critical parts, error logs with the same critical parts, and user-confirmed duplicated error logs. In an optional embodiment of the present invention, the operation of de-duplicating device 404 may be implemented by machine learning and/or users.

In an optional embodiment of the present invention, the extracted metadata is metadata in a defined time period and/or from a defined source.

In an optional embodiment of the present invention, common sequence generating device 402 further comprises: a common subsequence generating device 405 for generating a common error sequence set for every two metadata sets of the plurality of metadata sets; and a merging device 406 for merging the common error sequence sets generated for every two metadata sets into a common error sequence set of the plurality of metadata sets. Merging device 406 may further comprise a statistics device 407 for making statistics regarding how many times each common error sequence occurs.

In an optional embodiment of the present invention, common subsequence generating device 405 generates, in parallel, a common error sequence set for every two metadata sets of the plurality of metadata sets.

In an optional embodiment of the present invention, the error sequence may identify relations between the error log information.

In an optional embodiment of the present invention, the source information comprises information related to one or more of: application logs, system events, system logs, process dumps, thread dumps, user records, and application records; and/or the error log information comprises information related to one of more of: runtime error, warn, and DEBUG.

In an optional embodiment of the present invention, the metadata further comprises log level and/or sources of the error log information.

In an optional embodiment of the present invention, the common error sequence set comprises an error sequence set formed by the same error log information in the plurality of metadata sets. In a further optional embodiment of the present invention, the length of the error sequence formed by the same error log information is longer than a defined threshold.

In an optional embodiment of the present invention, a judgment criterion for being the same is defined by users.

Figure 5:
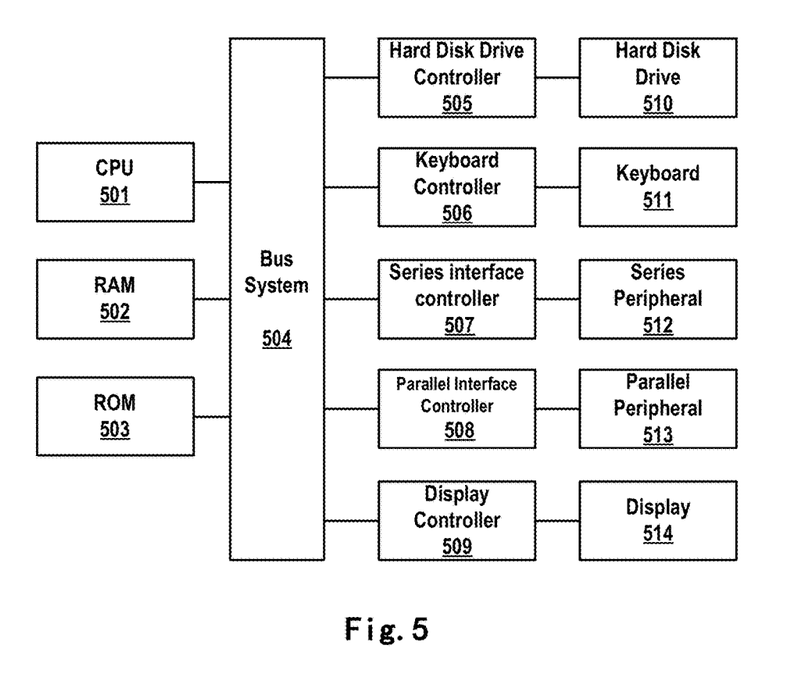
FIG. 5 shows a schematic block diagram of a computer system 500 which is applicable to implement the embodiments of the present invention.

FIG. 5 shows a schematic block diagram of a computer system which is applicable to implement the embodiments of the present invention. As shown in FIG. 5, the computer system may include: CPU (Central Process Unit) 501, RAM (Random Access Memory) 502, ROM (Read Only Memory) 503, System Bus 504, Hard Drive Controller 505, Keyboard Controller 506, Serial Interface Controller 507, Parallel Interface Controller 508, Display Controller 509, Hard Drive 510, Keyboard 511, Serial Peripheral Equipment 512, Parallel Peripheral Equipment 513 and Display 514. Among above devices, CPU 501, RAM 502, ROM 503, Hard Drive Controller 505, Keyboard Controller 506, Serial Interface Controller 507, Parallel Interface Controller 508 and Display Controller 509 are coupled to the System Bus 504. Hard Drive 510 is coupled to Hard Drive Controller 505. Keyboard 511 is coupled to Keyboard Controller 506. Serial Peripheral Equipment 512 is coupled to Serial Interface Controller 507. Parallel Peripheral Equipment 513 is coupled to Parallel Interface Controller 508. And, Display 514 is coupled to Display Controller 509.

It should be understood that the structure as shown in FIG. 5 is only for the exemplary purpose rather than any limitation to the present invention. In some cases, some devices may be added or removed based on specific situations.

In particular, besides hardware embodiments, the embodiments of the present invention may further be implemented in the form of a computer program product. For example, method 100 that has been described with reference to FIG. 1 may be implemented by a computer program product. The computer program product may be stored in RAM 502, ROM 503, Hard Drive 510 as shown in FIG. 5 and/or any appropriate storage media, or be downloaded to computer system 500 from an appropriate location via a network. The computer program product may include a computer code portion that comprises program instructions executable by an appropriate processing device (e.g., CPU 501 shown in FIG. 5). The program instructions at least may comprise: instructions for abstracting contents, which interact with user existing while loading a game, into one or more user interaction modules, wherein the user interaction modules may be loaded separately; and instructions for preferentially loading the user interaction module.

The spirit and principles of the present invention have been set forth above in conjunction with several embodiments. According to the embodiments of the present invention, the common error log sequence may be automatically extracted from a plurality of source files and saved automatically; by investigating the head event of the sequence pattern, there is a high possibility to find the root cause of all consequent errors, which is very useful in complex problem diagnostic, especially in multiple production environment. The errors' common sequence shows the times between different errors. If the time permits, the consequent error may be prevented via pre-active error sequence monitor. Moreover, the obtained historic common error sequence may be matched to the system's current error, so as to diagnose the error and recover it through appropriate measures.

Note that the embodiments of the present invention can be implemented in software, hardware or combination of software and hardware. The hardware portion can be implemented by using dedicated logic; the software portion can be stored in a memory and executed by an appropriate instruction executing system such as a microprocessor or dedicated design hardware. Those of ordinary skill in the art may appreciate that the above device and method can be implemented by using computer-executable instructions and/or by being contained in processor-controlled code, which is provided on carrier media like a magnetic disk, CD or DVD-ROM, programmable memories like a read-only memory (firmware), or data carriers like an optical or electronic signal carrier. The device and its modules can be embodied as semiconductors like very large scale integrated circuits or gate arrays, logic chips and transistors, or hardware circuitry of programmable hardware devices like field programmable gate arrays and programmable logic devices, or software executable by various types of processors, or a combination of the above hardware circuits and software, such as firmware.

Note that although several means or submeans of the device have been mentioned in the above detailed description, such division is merely exemplary and not mandatory. In fact, according to the embodiments of the present invention, the features and functions of two or more means described above may be embodied in one means. On the contrary, the features and functions of one means described above may be embodied by a plurality of means.

Although the present invention has been described with reference to several embodiments, it is to be understood that the present invention is not limited to the embodiments disclosed herein. The present invention is intended to embrace various modifications and equivalent arrangements comprised in the spirit and scope of the appended claims. The scope of the appended claims accords with the broadest interpretation, thereby embracing all such modifications and equivalent structures and functions.

What is claimed is:

1. A computer-executable method for information analysis using an analysis system including one or more processors, comprising:
    extracting, using the one or more processors, metadata from a source information set creating a metadata set, the metadata comprising error log information that forms an error sequence in the metadata set;
    generating a common error sequence set for the metadata set by comparing the metadata set to a previously generated metadata set;
    filtering invalid common error sequences, wherein the analysis system is enabled to place invalid common error sequences in a pattern blacklist for future filtering;
    periodically analyzing the pattern blacklist to determine whether valid common error sequences were placed in the pattern blacklist; and
    providing and storing the common error sequence set in a repository to enable diagnosis of future errors.

2. The computer-executable method according to claim 1, further comprising:
    wherein the metadata comprises time information; and
    normalizing the time information in the metadata set.

3. The computer-executable method according to claim 1, further comprising:
    de-duplicating error log information in the metadata set.

4. The computer-executable method according to claim 3, wherein the de-duplicating error log information comprises removing messages of one or more types of:
    totally the same error logs, error logs that are totally the same except the non-critical parts, error logs with the same critical parts, and user-confirmed duplicated error logs.

5. The computer-executable method according to claim 3, wherein the de-duplicating error log information comprises implementing by machine learning and/or users.

6. The computer-executable method according to claim 1, wherein the extracted metadata is metadata in a defined source.

7. The computer-executable method according to claim 1, wherein the generating a common error sequence set for a plurality of the metadata sets comprises:
    generating a common error sequence set for every two metadata sets of the plurality of the metadata sets; and
    merging the common error sequence sets generated for every two metadata sets into a common error sequence set of the plurality of the metadata sets.

8. The computer-executable method according to claim 7, wherein the generating a common error sequence set for every two metadata sets of the plurality of the metadata sets is implemented in parallel.

9. The computer-executable method according to claim 7, wherein the merging the common error sequence sets generated for every two metadata sets into a common error sequence set of the plurality of the metadata sets further comprises:

making statistics regarding how many times each common error sequence occurs.

10. The computer-executable method according to claim 1, wherein the error sequence identifies relations between the error log information.

11. The computer-executable method according to claim 1, wherein the source information comprises information related to one or more of: application logs, system events, system logs, process dumps, thread dumps, user records, and application records; and/or the error log information comprises information related to one of more of: runtime error, warn, and DEBUG.

12. The computer-executable method according to claim 1, wherein the metadata further comprises log level and/or sources of the error log information.

13. The computer-executable method according to claim 1, wherein the common error sequence set comprises an error sequence set formed by the same error log information in the plurality of the metadata sets.

14. The computer-executable method according to claim 13, wherein a length of the error sequence formed by the same error log information is longer than a defined threshold.

15. The computer-executable method according to claim 13, wherein a judgment criterion for being the same is defined by users.

16. A system, comprising:
an analysis system including one or more processors; and
computer-executable program logic encoded in memory of one or more computers enabled to analyze information using the analysis system, wherein the computer-executable program logic is configured for the execution of:
extracting, using the one or more processors, metadata from a source information set creating a metadata set, the metadata comprising error log information that forms an error sequence in the metadata set;
generating a common error sequence set for the metadata set by comparing the metadata set to a previously generated metadata set;
filtering invalid common error sequences, wherein the analysis system is enabled to place invalid common error sequences in a pattern blacklist for future filtering;
periodically analyzing the pattern blacklist to determine whether valid common error sequences were placed in the pattern blacklist; and
providing and storing the common error sequence set in a repository to enable diagnosis of future errors.

17. The system according to claim 16, wherein the metadata further comprises time information, and the wherein the computer-executable program logic is further configured for the execution of normalizing the time information in the metadata set.

18. The system according to claim 16, wherein the computer-executable program logic is further configured for the execution of:
de-duplicating error log information in the metadata set.

19. The system according to claim 18, wherein the de-duplicating error log information comprises removing messages of one or more types of:
totally the same error logs, error logs that are totally the same except the non-critical parts, error logs with the same critical parts, and user-confirmed duplicated error logs.

20. The system according to claim 18, wherein the de-duplicating error log information comprises implementing by machine learning and/or users.

* * * * *